(12) United States Patent
Matsunaga et al.

(10) Patent No.: US 10,845,204 B2
(45) Date of Patent: Nov. 24, 2020

(54) VEHICLE, ROUTE CALCULATION DEVICE, AND ROUTE CALCULATION METHOD

(71) Applicant: HONDA MOTOR CO., LTD., Tokyo (JP)

(72) Inventors: Hideki Matsunaga, Wako (JP); Masaaki Nagashima, Wako (JP); Takeru Goto, Wako (JP); Hirokiyo Kasahara, Wako (JP); Yoshimitsu Murahashi, Wako (JP); Takumi Machida, Tokyo (JP); Toshiaki Takano, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 73 days.

(21) Appl. No.: 16/203,013

(22) Filed: Nov. 28, 2018

(65) Prior Publication Data

US 2019/0170522 A1 Jun. 6, 2019

(30) Foreign Application Priority Data

Dec. 1, 2017 (JP) .................................. 2017-231491

(51) Int. Cl.
*G01C 21/34* (2006.01)
*G06K 9/00* (2006.01)
*G05D 1/00* (2006.01)
*G08G 1/00* (2006.01)

(52) U.S. Cl.
CPC ..... *G01C 21/3415* (2013.01); *G06K 9/00825* (2013.01); *G05D 1/00* (2013.01); *G08G 1/00* (2013.01)

(58) Field of Classification Search
CPC .. G01C 21/3415; G06K 9/00825; G05D 1/00; G08G 1/00; G08G 1/096844; G08G 1/096805; G08G 1/096833; G08G 1/096725
USPC ........................................................ 701/410
See application file for complete search history.

(56) References Cited

U.S. PATENT DOCUMENTS

| | | | |
|---|---|---|---|
| 2007/0150182 A1* | 6/2007 | Okusa | G01C 21/3658 701/533 |
| 2010/0057336 A1* | 3/2010 | Levine | G01C 21/32 701/532 |
| 2017/0103653 A1* | 4/2017 | Satomura | G08G 1/09675 |
| 2017/0356755 A1* | 12/2017 | Strawn | G01C 21/3635 |
| 2018/0266834 A1* | 9/2018 | Cronin | B60R 16/037 |

FOREIGN PATENT DOCUMENTS

| | | | |
|---|---|---|---|
| JP | 2010-107305 | * | 5/2010 |
| JP | 2010-107305 A | | 5/2010 |
| WO | WO-2017-018852 | * | 2/2017 |

* cited by examiner

*Primary Examiner* — Muhammad Shafi
(74) *Attorney, Agent, or Firm* — Carrier Blackman & Associates, P.C.; Joseph P. Carrier; Jeffrey T. Gedeon

(57) ABSTRACT

If it is determined that, at a target exit of a roundabout that exists in a target route, a travel restricting event that restricts passing of a vehicle through the target exit has occurred on the basis of a peripheral travel environment detected by a peripheral environment detection unit, a route calculation device of the vehicle adds one circulation or a part of the circulation in the roundabout to the target route.

10 Claims, 9 Drawing Sheets

VEHICLE, ROUTE CALCULATION DEVICE, AND ROUTE CALCULATION METHOD

CROSS-REFERENCE TO RELATED APPLICATION

This application is based upon and claims the benefit of priority from Japanese Patent Application No. 2017-231491 filed on Dec. 1, 2017, the contents of which are incorporated herein by reference.

BACKGROUND OF THE INVENTION

Field of the Invention

The present invention relates to a vehicle that travels smoothly in a roundabout, a route calculation device, and a route calculation method.

Description of the Related Art

An object of Japanese Laid-Open Patent Publication No. 2010-107305 is to correctly predict the behavior of a vehicle at an intersection where the vehicle can travel to a plurality of traveling directions ([0003], Abstract). In order to achieve this object, in the above Japanese Laid-Open Patent Publication No. 2010-107305 (Abstract, claim 1), own vehicle positional information expressing a position of an own vehicle is obtained. On the basis of the own vehicle positional information, travel trajectory information for a travel trajectory of the own vehicle within the intersection is obtained. After relating the travel trajectory information with an entry path into the intersection and an exit path from the intersection, the information is stored in a storage medium.

In addition, in Japanese Laid-Open Patent Publication No. 2010-107305 (claim 4), when the own vehicle positional information indicates that the own vehicle will enter the intersection, a road where the own vehicle travels is regarded as the entry path and a road where the own vehicle is scheduled to travel after passing the intersection is regarded as the exit path. The travel trajectory information related with the entry path and the exit path is obtained from the storage medium, and the own vehicle is controlled based on the obtained travel trajectory information.

SUMMARY OF THE INVENTION

In Japanese Laid-Open Patent Publication No. 2010-107305, the entry path (target entry) and the exit path (target exit) are specified in regard to the intersection where the vehicle can travel to the traveling directions (roundabout), and the own vehicle is controlled based on the travel trajectory information related with these paths (claim 4). However, Japanese Laid-Open Patent Publication No. 2010-107305 failed to examine how to deal with a travel restricting event in which the passing of the own vehicle through the exit path (target exit) is restricted.

For example, in a case where the exit path is temporarily congested with other vehicles because a traffic light over the target exit is red or a crossing gate is closed, this situation may be solved by causing the vehicle to go round the roundabout once or a plurality of times. On the other hand, in a case where the target exit is congested with other vehicles because a traffic accident has happened over the target exit or a road construction is carried out, for example, a traffic jam may continue for a long time. In other words, if the travel restricting event to restrict the passing of the own vehicle has occurred at the target exit, the solution depends on what is the travel restricting event; for example, it is better for the vehicle to circle in the roundabout once or a plurality of times, or to change the route. These situations are not examined in Japanese Laid-Open Patent Publication No. 2010-107305.

The present invention has been made in view of the above circumstances, and an object is to provide a vehicle that can travel smoothly in a roundabout, a route calculation device, and a route calculation method.

A vehicle according to the present invention includes: a destination setting device configured to set a destination of the vehicle; a route calculation device configured to calculate a target route from a current position to the destination; a travel control unit configured to cause the vehicle to travel autonomously in at least a part of a route to the destination; and a peripheral environment detection unit configured to detect a peripheral travel environment of the vehicle and detect a roundabout that exists in the target route, wherein if it is determined that, at a target exit of the roundabout that exists in the target route, a travel restricting event that restricts passing of the vehicle through the target exit has occurred on a basis of the peripheral travel environment, the route calculation device is configured to add one circulation or a part of the circulation in the roundabout to the target route.

According to the present invention, if it is determined that, at the target exit of the roundabout that exists in the target route, the travel restricting event that restricts passing through the target exit has occurred, one circulation or a part of the circulation in the roundabout is added to the target route. Thus, while the vehicle goes round the roundabout, the target route can be searched again (or can be reset), for example. In particular, if one circulation in the roundabout is added to the target route, it is possible to wait until the circumstance at the target exit changes while the vehicle goes round the roundabout once. Therefore, the vehicle can travel smoothly in the roundabout.

If it is determined that the travel restricting event has occurred, the route calculation device may be configured to set an exit whose expected detour time taken to reach a reference point in the target route is shortest among a plurality of different exits of the roundabout, as a new target exit. Therefore, the new target exit can be set appropriately.

If it is determined that the travel restricting event has occurred, the route calculation device may be configured to calculate an initial expected time expected to take from the target exit to a reference point in the target route under a condition before it is determined that the travel restricting event has occurred or a condition reflecting the travel restricting event, an expected detour time taken to reach the reference point through a different exit of the roundabout, and an expected circulation time expected to take to go round the roundabout once. In addition, if the expected detour time is shorter than a total of the initial expected time and the expected circulation time, the route calculation device may be configured to reset the target route so that the target route includes the different exit.

Thus, in a case where it is expected to reach the reference point sooner when passing the different exit than when going round the roundabout once and considering the change at the target exit, choosing to pass the different exit makes it possible to reach the reference point sooner.

The peripheral environment detection unit may be configured to detect a preceding vehicle that exists ahead of the vehicle. In addition, the route calculation device may be configured to obtain reference information of the preceding vehicle stopping at the target exit. Moreover, the route calculation device may be configured to obtain comparative information of the preceding vehicle stopping at the target exit after one circulation. Furthermore, the route calculation device may be configured to determine progress of the preceding vehicle by comparing the reference information and the comparative information. In addition, the route calculation device may be configured to maintain the target exit in a case where the progress is more than a progress threshold.

Thus, if it is considered that the progress of the preceding vehicle stopping at the target exit of the roundabout is large and it does not take much time to pass the target exit, it is possible to maintain the target exit.

The route calculation device may be configured to calculate an updated expected time taken to reach a reference point in the target route through the target exit on a basis of the progress. In addition, the route calculation device may be configured to calculate an expected detour time taken to reach the reference point through a different exit of the roundabout. Moreover, the route calculation device may be configured to maintain the target route in a case where the expected detour time is longer than the updated expected time. Furthermore, the route calculation device may be configured to reset the target route so that the target route includes the different exit in a case where the expected detour time is shorter than the updated expected time. Thus, the target route can be maintained or reset in consideration of the change at the target exit as the vehicle goes round the roundabout.

The route calculation device may be configured to repeat updating the progress or the updated expected time every time the vehicle goes round the roundabout. Thus, by improving the calculation accuracy of the progress or the updated expected time, it is possible to compare the updated expected time and the expected detour time with high accuracy.

The route calculation device may be configured to cause the vehicle to go round the roundabout again in a case where a difference between the updated expected time and the expected detour time is less than a time threshold. Thus, by going round the roundabout again, it is possible to improve the calculation accuracy of the updated expected time.

The route calculation device may be configured to use the target route including the shorter one of the updated expected time and the expected detour time in a case where circulation times in the roundabout is more than a circulation times threshold in a state that the difference between the updated expected time and the expected detour time is less than the time threshold. Thus, in the state that a certain degree of the calculation accuracy is secured in regard to the updated expected time, the target route can be selected using the expected time that is assumed to be shorter (updated expected time or expected detour time).

A route calculation device according to the present invention is a route calculation device configured to calculate a target route from a current position of a vehicle to a destination that is set through a destination setting device, and the route calculation device is configured to: obtain, from a peripheral environment detection unit, information regarding a peripheral travel environment of the vehicle and information regarding a roundabout that exists in the target route; and if it is determined that, at a target exit of the roundabout that exists in the target route, a travel restricting event that restricts passing of the vehicle through the target exit has occurred on a basis of the peripheral travel environment, add a circulation in the roundabout to the target route.

A route calculation method according to the present invention is a method including a target route calculation step where a route calculation device calculates a target route from a current position of a vehicle to a destination of the vehicle that is set through a destination setting device, and the route calculation method further includes: a detection step where a peripheral environment detection unit detects a peripheral travel environment of the vehicle and a roundabout that exists in the target route; a determination step where the route calculation device determines whether, at a target exit of the roundabout that exists in the target route, a travel restricting event that restricts passing of the vehicle through the target exit has occurred on a basis of the peripheral travel environment; and an addition step where the route calculation device adds a circulation in the roundabout to the target route in a case where it is determined that the travel restricting event has occurred.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A. One Embodiment

<A-1. Configuration>

[A-1-1. Outline]

Figure 1:
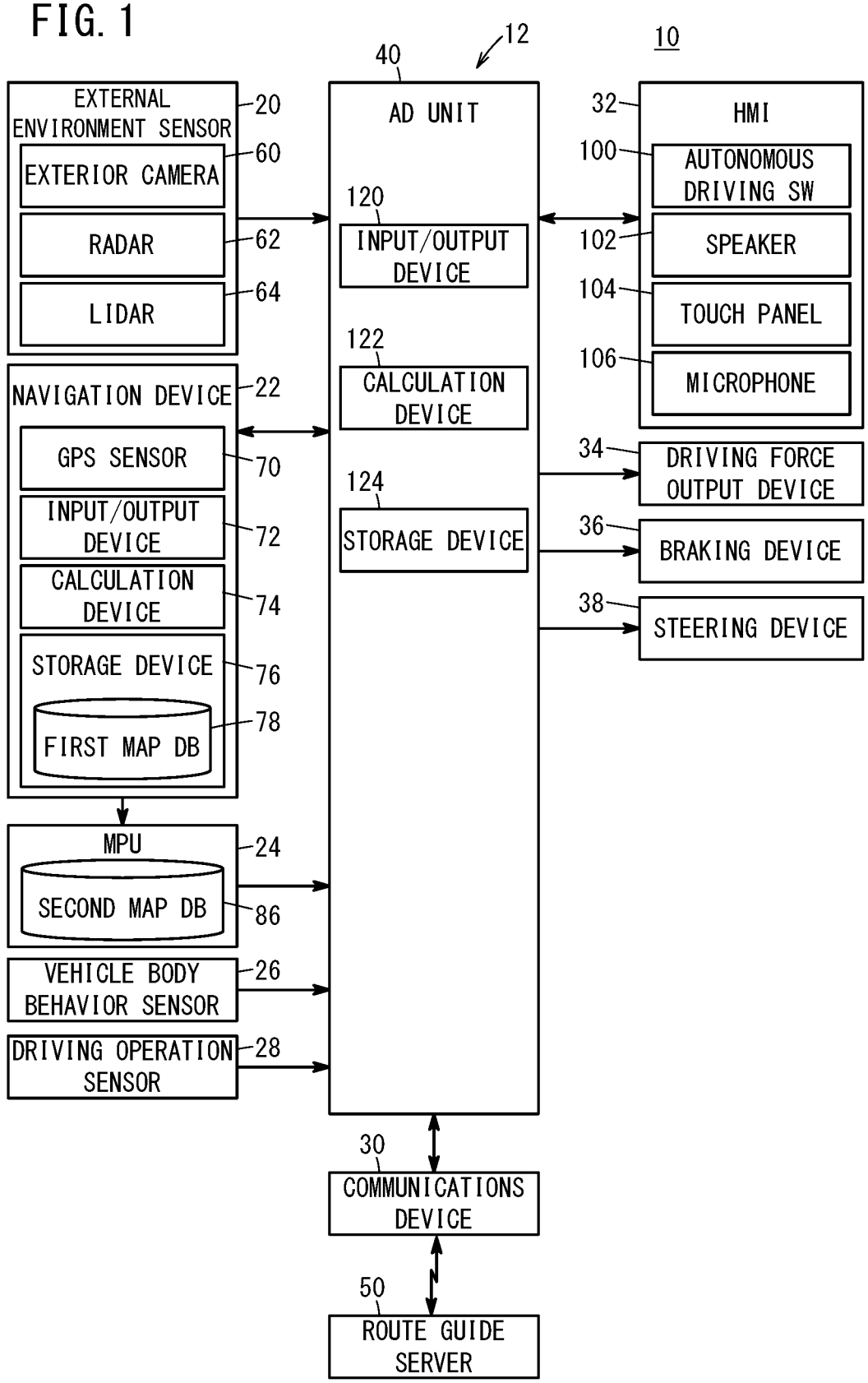
FIG. 1 is a block diagram schematically illustrating a configuration of a vehicle according to a first embodiment of the present invention.

FIG. 1 is a block diagram schematically illustrating a configuration of a vehicle 10 according to a first embodiment of the present invention. The vehicle 10 (hereinafter also referred to as "own vehicle 10") includes an external environment sensor 20, a navigation device 22, a map positioning unit 24 (hereinafter referred to as "MPU 24"), a vehicle body behavior sensor 26, a driving operation sensor 28, a communications device 30, a human machine interface 32 (hereinafter referred to as "HMI 32"), a driving force output device 34, a braking device 36, a steering device 38, and an AD unit 40. "AD" of the AD unit 40 stands for autonomous driving (automated driving). The navigation device 22, the MPU 24, and the AD unit 40 form a travel control unit 12.

[A-1-2. External Environment Sensor 20]

The external environment sensor 20 detects information regarding an external environment of the vehicle 10 (hereinafter also referred to as "external environment information Ie"). The external environment sensor 20 detects a peripheral travel environment of the vehicle 10. The peripheral travel environment herein described includes preceding vehicles (other vehicles) 330 (FIG. 4), a traffic accident, a road construction, a traffic jam, and the like. The external environment sensor 20 detects a roundabout 300 (FIG. 4) that exists in a travel path of the vehicle 10.

As illustrated in FIG. 1, the external environment sensor 20 includes a plurality of exterior cameras 60, a plurality of radars 62, and a LIDAR 64 (Light Detection And Ranging).

The exterior cameras 60 output image information Iimage regarding a peripheral image Fs capturing a periphery (front, side, and rear) of the vehicle 10. The radars 62 output radar information Iradar expressing reflection waves for electromagnetic waves that are transmitted to the periphery (front, side, and rear) of the vehicle 10. The LIDAR 64 continuously emits laser to all directions of the vehicle 10, and measures three-dimensional positions of reflection points on the basis of the reflection waves; thus, the LIDAR 64 outputs the three-dimensional positions as three-dimensional information Ilidar.

[A-1-3. Navigation Device 22]

The navigation device 22 calculates a target route Rtar from a current position Pcur to a destination Ptar, and shows the target route Rtar to an occupant and additionally, outputs the target route Rtar to the MPU 24. As illustrated in FIG. 1, the navigation device 22 includes a global positioning system sensor 70 (hereinafter referred to as "GPS sensor 70"), an input/output device 72, a calculation device 74, and a storage device 76.

The GPS sensor 70 detects the current position Pcur of the vehicle 10. The input/output device 72 performs input/output with other device than the navigation device 22 (the device may be the MPU 24 or the AD unit 40). The calculation device 74 performs target route calculation control to calculate the target route Rtar from the current position Pcur to the destination Ptar. The destination Ptar is input from a user through the HMI 32 (especially, a touch panel 104 or a microphone 106).

In addition, the calculation device 74 reads out map information Imap for the current position Pcur detected by the GPS sensor 70 from a first map database 78 of the storage device 76 (hereinafter referred to as "first map DB 78"), and uses the map information Imap to calculate the target route Rtar.

Figure 2:
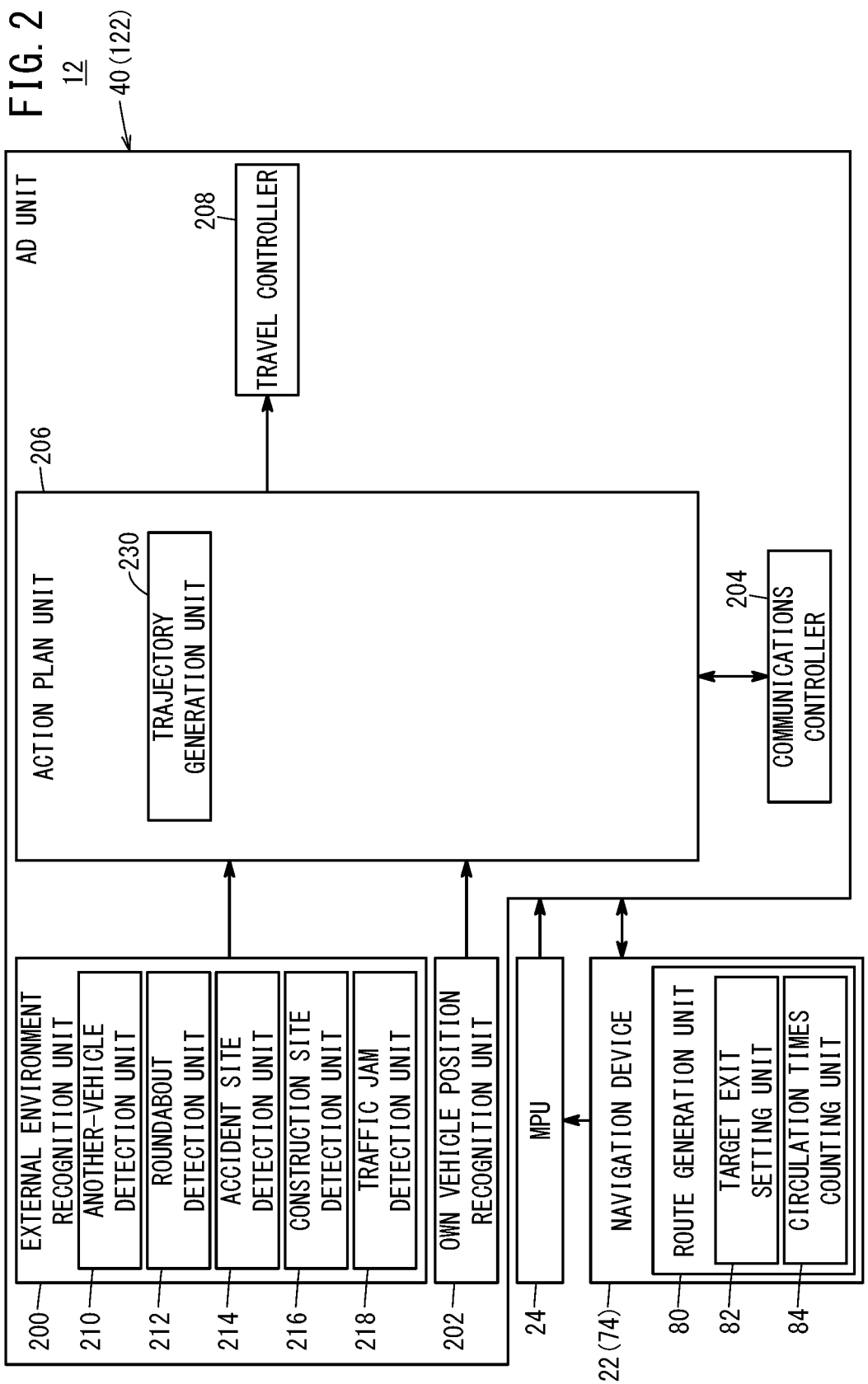
FIG. 2 illustrates each subunit of a travel control unit according to the first embodiment.
Figure 4:
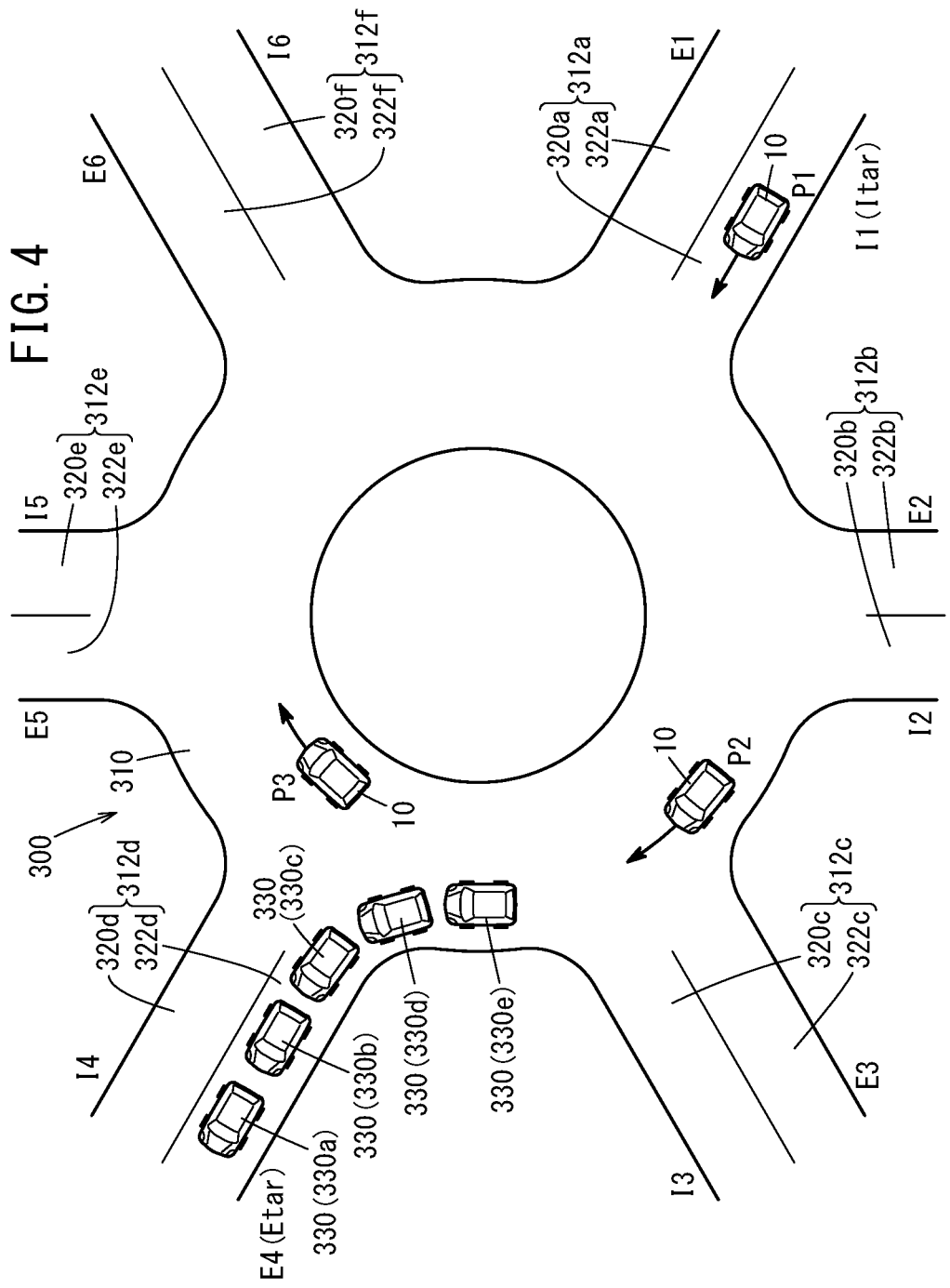
FIG. 4 illustrates one example of a scene in which a roundabout related process in the first embodiment is performed.

FIG. 2 illustrates each subunit of the travel control unit 12 according to the first embodiment. As illustrated in FIG. 2, the calculation device 74 includes a route generation unit 80 that generates the target route Rtar from the current position Pcur to the destination Ptar. If autonomous driving control is being performed, the route generation unit 80 transmits the target route Rtar to the MPU 24. The route generation unit 80 includes a target exit setting unit 82 and a circulation times counting unit 84. The target exit setting unit 82 sets a target exit Etar of the own vehicle 10 at the roundabout 300 (FIG. 4). The circulation times counting unit 84 counts circulation times N of the own vehicle 10 in the roundabout 300.

The storage device 76 stores programs and data to be used by the calculation device 74, and the first map DB 78. The storage device 76 includes, for example, a random access memory (hereinafter referred to as "RAM"). The RAM may be a volatile memory such as a register or a nonvolatile memory such as a flash memory. The storage device 76 may include, in addition to RAM, a read-only memory (hereinafter, "ROM") and/or a solid state drive (hereinafter, "SSD").

[A-1-4. MPU 24]

The MPU 24 manages a second map database 86 (hereinafter, "second map DB 86"). The map information Imap stored in the second map DB 86 is more precise than the map information Imap in the first map DB 78, and the accuracy of position is less than or equal to centimeters. While the first map DB 78 does not include the detailed information about lanes in the roads, the second map DB 86 includes the detailed information about lanes in the roads. The MPU 24 reads out the map information Imap (high-precision map), which includes the target route Rtar received from the navigation device 22, from the second map DB 86 and transmits the map information Imap to the AD unit 40. The map information Imap (high-precision map) including the target route Rtar is used in the autonomous driving control.

[A-1-5. Vehicle Body Behavior Sensor 26]

The vehicle body behavior sensor 26 detects information regarding the behavior of the vehicle 10 (especially, a vehicle body) (this information is hereinafter also referred to as "vehicle body behavior information Ib"). The vehicle body behavior sensor 26 includes a vehicle speed sensor, an acceleration sensor, and a yaw rate sensor (none of them are shown). The vehicle sensor detects a vehicle speed V [km/h] and a traveling direction of the vehicle 10. The acceleration sensor detects an acceleration G [m/s/s] of the vehicle 10. The acceleration G includes a longitudinal acceleration $\alpha$, a lateral acceleration Glat, and a vertical acceleration Gv (or may be any one of these accelerations). The yaw rate sensor detects a yaw rate Y [rad/s] of the vehicle 10.

[A-1-6. Driving Operation Sensor 28]

The driving operation sensor 28 detects information regarding a driving operation of a driver (hereinafter also referred to as "driving operation information Ido"). The driving operation sensor 28 includes an accelerator pedal sensor and a braking pedal sensor (neither are shown). The accelerator pedal sensor detects the operation amount [%] of the accelerator pedal that is not shown. The braking pedal sensor detects the operation amount [%] of the braking pedal that is not shown. The driving operation sensor 28 may include a steering angle sensor and a steering torque sensor (neither are shown).

[A-1-7. Communications Device 30]

The communications device 30 communicates wirelessly with external devices. Examples of the external devices include a route guide server 50. The communications device 30 according to the present embodiment is intended to be mounted (or always fixed) in the vehicle 10; however, for example, the communications device 30 according to the present embodiment may be carried out of the vehicle 10 like a mobile phone or a smart phone.

[A-1-8. HMI 32]

The HMI 32 (destination setting device) receives an operation input from the occupant, and shows various pieces of information to the occupant visually, audibly, and tactually. The HMI 32 is also used to set the destination Ptar of the vehicle 10. The HMI 32 includes an autonomous driving switch 100 (hereinafter also referred to as "autonomous driving SW 100"), a speaker 102, the touch panel 104, and the microphone 106.

The autonomous driving SW 100 is a switch for the occupant to order start or stop of the autonomous driving control. In addition to or instead of the autonomous driving SW 100, another method (for example, voice input through the microphone 106) may be employed to order start or stop of the autonomous driving control. The touch panel 104 includes, for example, a liquid crystal panel or an organic EL panel.

[A-1-9. Driving Force Output Device 34]

The driving force output device 34 includes a travel driving source (an engine, a traction motor, or the like) and a driving electronic control unit (hereinafter referred to as "driving ECU") that are not shown, and generates travel driving force of the vehicle 10. The driving ECU controls the travel driving source on the basis of the operation amount of the accelerator pedal or the instruction from the AD unit 40 so as to adjust the travel driving force of the vehicle 10.

[A-1-10. Braking Device 36]

The braking device 36 includes a braking motor (or a hydraulic mechanism), a braking member, and a braking electronic control unit (hereinafter referred to as "braking ECU") that are not shown, and generates braking force of the vehicle 10. The braking device 36 may control engine braking by an engine and/or regenerative braking by a traction motor. The braking ECU controls the braking force of the vehicle 10 by operating the braking motor or the like on the basis of the operation amount of the braking pedal or the instruction from the AD unit 40.

[A-1-11. Steering Device 38]

The steering device 38 includes an electric power steering (EPS) motor and an EPS electronic control unit (hereinafter referred to as "EPS ECU") that are not shown, and changes a steering angle of the vehicle 10. The EPS ECU controls the EPS motor in accordance with the driver's operation of the steering wheel or the instruction from the AD unit 40 so as to control the steering angle of the vehicle 10.

[A-1-12. AD Unit 40]

(A-1-12-1. Outline of AD Unit 40)

The AD unit 40 performs the autonomous driving control to drive the vehicle 10 to the destination Ptar without the driver's driving operation (accelerating, decelerating, and steering). In other words, the AD unit 40 controls the driving force output device 34, the braking device 36, and the steering device 38 so that the vehicle 10 travels along a target trajectory Ltar. The AD unit 40 includes an input/output device 120, a calculation device 122, and a storage device 124. The calculation device 122 includes a central processing unit (CPU), for example.

The input/output device 120 performs input/output with other device than the AD unit 40 (the device may be the sensors 20, 26, 28). The calculation device 122 performs the calculation on the basis of signals from the sensors 20, 26, 28, the navigation device 22, the MPU 24, the communications device 30, the HMI 32, and the like. Then, on the basis of the calculation results, the calculation device 122 generates signals for the communications device 30, the HMI 32, the driving force output device 34, the braking device 36, and the steering device 38. The details of the calculation device 122 are described below with reference to FIG. 2.

The storage device 124 stores programs and data to be used by the calculation device 122. The storage device 124 includes RAM, for example. In addition to RAM, the storage device 124 may include ROM and/or SSD.

(A-1-12-2. Calculation Device 122)

As illustrated in FIG. 2, the calculation device 122 in the AD unit 40 includes an external environment recognition unit 200, an own vehicle position recognition unit 202, a communications controller 204, an action plan unit 206, and a travel controller 208. Each unit is achieved by, for example, causing the calculation device 122 (such as a CPU) to execute the programs stored in the storage device 124 of the AD unit 40. The programs may be supplied from the route guide server 50 through the communications device 30. The programs may be partially formed by hardware (circuit component).

The external environment recognition unit 200 recognizes a circumstance and an object around the own vehicle 10 on the basis of external environment information Ie from the external environment sensor 20 (FIG. 1). The external environment recognition unit 200 recognizes an overall road environment such as a road shape, a road width, a position of a lane mark, the number of lanes, a lane width, and a lighting state of a traffic signal on the basis of the image information Iimage from the exterior camera 60.

The external environment recognition unit 200 includes an another-vehicle detection unit 210, a roundabout detection unit 212, an accident site detection unit 214, a construction site detection unit 216, and a traffic jam detection unit 218. The another-vehicle detection unit 210 detects another vehicle 330 (FIG. 4) that exists around the own vehicle 10. To detect another vehicle 330, the image information Iimage from the exterior camera 60 is used. Alternatively, another vehicle 330 may be detected by communicating with another vehicle 330 or a server (for example, the route guide server 50) through the communications device 30.

The roundabout detection unit 212 detects the roundabout 300 (FIG. 4) that exists in the target route Rtar generated by the navigation device 22. To detect the roundabout 300, for example, the current position Pcur of the own vehicle 10 and the map information Imap from the MPU 24 are used. Alternatively, this detection can be performed using the image information Iimage. Specifically, if there is a (traffic) sign of the roundabout 300 in the target route Rtar of the own vehicle 10, the sign is recognized as an image to detect the existence of the roundabout 300. In another example of detecting the roundabout 300, the image of the roundabout 300 itself may be obtained and subjected to pattern matching.

The accident site detection unit 214 detects an accident site (not shown) around the own vehicle 10. To detect the accident site, the image information Iimage from the exterior camera 60 is used. In another example of detecting the accident site, the communication with a road side beacon (not shown) or the server (for example, the route guide server 50) may be carried out through the communications device 30.

The construction site detection unit 216 detects a construction site (not shown) that exists around the own vehicle 10. To detect the construction site, the image information Iimage from the exterior camera 60 is used. In another example of detecting the construction site, the communication with the road side beacon (not shown) or the server (for example, the route guide server 50) may be carried out through the communications device 30.

The traffic jam detection unit 218 detects the traffic jam in the target route Rtar of the own vehicle 10. To detect the traffic jam, for example, traffic jam information may be obtained by the communication between the own vehicle 10 and another vehicle 330. In another example of detecting the traffic jam, the communication with the road side beacon (not shown) or the server (for example, the route guide server 50) may be carried out through the communications device 30.

The own vehicle position recognition unit 202 recognizes the current position Pcur of the own vehicle 10 with high accuracy on the basis of the recognition result from the external environment recognition unit 200, the map information Imap from the MPU 24, and the current position Pcur from the navigation device 22. The communications controller 204 controls the communication between the AD unit 40 and an exterior device (such as the route guide server 50).

The action plan unit 206 determines the travel circumstance of the own vehicle 10 and sets various actions of the own vehicle 10 on the basis of the map information Imap (high-precision map) from the MPU 24, the recognition results from the external environment recognition unit 200 and the own vehicle position recognition unit 202, and the detection result from the vehicle body behavior sensor 26. Specifically, the action plan unit 206 calculates the target trajectory Ltar, the target vehicle speed Vtar, and the like.

As illustrated in FIG. 2, the action plan unit 206 includes a trajectory generation unit 230. The trajectory generation unit 230 generates the target trajectory Ltar to the destination Ptar and causes the vehicle 10 to travel autonomously to the destination Ptar.

The target route Rtar calculated by the navigation device 22 is the route used to show the driver the road to advance, and is a relatively rough one. In contrast to this, the target trajectory Ltar calculated by the action plan unit 206 includes, in addition to the rough one calculated by the navigation device 22, relatively specific information used to control accelerating, decelerating, and steering of the vehicle 10.

The travel controller 208 calculates and transmits control instructions for the driving force output device 34, the braking device 36, and the steering device 38 on the basis of decision results from the action plan unit 206 (such as target trajectory Ltar and target vehicle speed Vtar). In other words, the travel controller 208 controls output of actuators that control the vehicle body behaviors. The actuators herein described include the engine, the braking motor, the EPS motor, and the like. By controlling the output of the actuator, the travel controller 208 controls the amount of behavior of the vehicle 10 (particularly, a vehicle body) (hereinafter referred to as "vehicle body behavior amount Qb"). The vehicle body behavior amount Qb here includes, for example, the vehicle speed V, the longitudinal acceleration α, a steering angle θst, the lateral acceleration Glat, and the yaw rate Y.

[A-1-13. Route Guide Server 50]

The route guide server 50 generates or calculates the target route Rtar to the destination Ptar instead of the vehicle 10, on the basis of the destination Ptar and the current position Pcur of the vehicle 10 received from the communications device 30. The route guide server 50 includes an input/output device, a communications device, a calculation device, and a storage device that are not shown. The storage device stores programs and data to be used by the calculation device.

<A-2. Control in First Embodiment>

[A-2-1. Outline]

The vehicle 10 according to the first embodiment can perform the autonomous driving control to cause the vehicle 10 to travel autonomously to the destination Ptar. The autonomous driving control is performed by the navigation device 22, the MPU 24, and the AD unit 40 (that is, the travel control unit 12).

In the first embodiment, when the vehicle 10 is within the roundabout 300 (FIG. 4), the travel control unit 12 (particularly, the navigation device 22) performs a roundabout related process. The roundabout related process is a process of changing or maintaining the target route Rtar in accordance with a travel restricting event Plim at the target exit Etar of the roundabout 300 (for example, the exit is congested with the preceding vehicles 330).

[A-2-2. Autonomous Driving Control]

Figure 3:
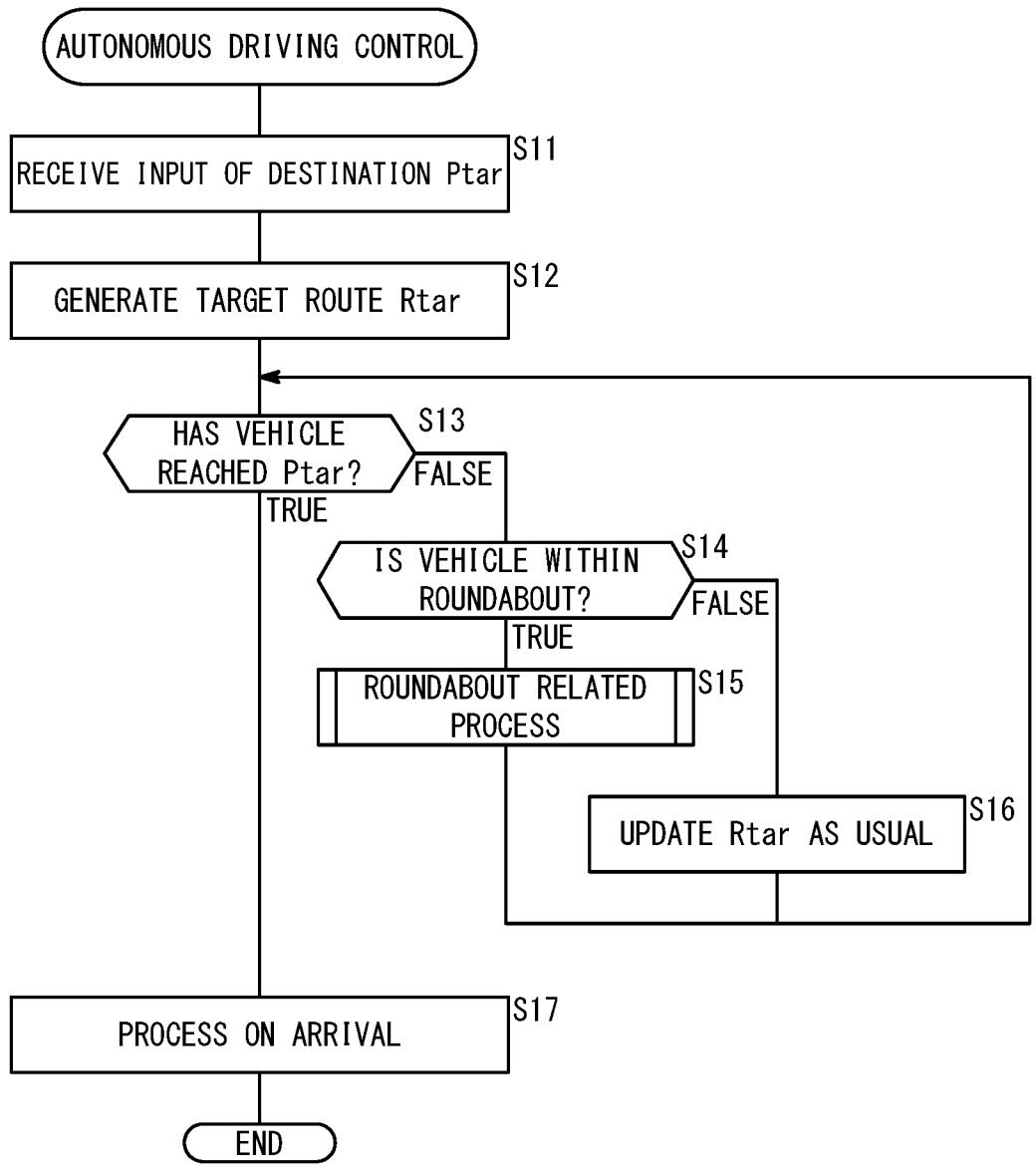
FIG. 3 is a flowchart of autonomous driving control in the first embodiment.

FIG. 3 is a flowchart of the autonomous driving control in the first embodiment. In step S11, the navigation device 22 receives the input of the destination Ptar from the user through the HMI 32 (the touch panel 104, the microphone 106, etc.). In step S12, the navigation device 22 generates the target route Rtar from the current position Pcur to the destination Ptar. The navigation device 22 notifies the generated target route Rtar to the MPU 24.

The MPU 24 reads out the map information Imap (high-precision map) including the target route Rtar from the second map DB 86, and transmits the map information Imap to the AD unit 40. The AD unit 40 generates the target trajectory Ltar on the basis of the map information Imap (high-precision map) from the MPU 24 and the recognition results from the external environment recognition unit 200 and the own vehicle position recognition unit 202. The AD unit 40 controls the driving force output device 34, the braking device 36, the steering device 38, and the like on the basis of the target trajectory Ltar.

In the first embodiment, the target route Rtar shows a relatively long trajectory from the current position Pcur to a vehicle destination Pvtar, and the target trajectory Ltar shows a relatively short trajectory required for the own vehicle 10 to perform the autonomous driving. However, the target route Rtar and the target trajectory Ltar may be collectively used.

In step S13, the navigation device 22 determines whether the own vehicle 10 has reached the destination Ptar. If the own vehicle 10 has not reached the destination Ptar (S13: FALSE), the navigation device 22 determines whether the own vehicle 10 exists within the roundabout 300 in step S14. This determination is performed by, for example, using the current position Pcur of the own vehicle 10 and the map information Imap of the first map DB 78. Alternatively, this determination may be performed using the detection result from the roundabout detection unit 212. Specifically, if there is a sign of the roundabout 300 in the target route Rtar of the own vehicle 10, this sign may be recognized as an image to detect the existence of the roundabout 300. In another example of detecting the roundabout 300, the image of the roundabout 300 itself may be obtained and subjected to pattern matching.

If the own vehicle 10 exists within the roundabout 300 (S14: TRUE), the navigation device 22 performs the roundabout related process in step S15. The details of the roundabout related process are described below with reference to FIG. 4, FIG. 5, etc. If the own vehicle 10 does not exist within the roundabout 300 (S14: FALSE), the navigation device 22 updates the target route Rtar as usual in step S16 and the process returns to step S13. The AD unit 40 generates the target trajectory Ltar based on the updated target route Rtar. Updating the target route Rtar as usual means a process to update the target route Rtar as the vehicle 10 moves. After step S15 or S16, the process returns to step S13. If the own vehicle 10 has reached the destination Ptar (S13: TRUE), the AD unit 40 performs a process on arrival in which, for example, the arrival at the destination Ptar is notified to the occupant in step S17.

[A-2-3. Roundabout Related Process]

(A-2-3-1. Outline)

FIG. 4 illustrates one example of a scene in which the roundabout related process in the first embodiment is performed. That is to say, in this example, the own vehicle 10 travels within the roundabout 300. The first embodiment describes the example in which vehicles keep to the left. Therefore, in FIG. 4, the own vehicle 10 travels within the roundabout 300 (circular road 310) clockwise. That is to say, three own vehicles 10 that are illustrated in FIG. 4 are the same vehicle. In other words, FIG. 4 shows the vehicle 10 moving along points P1, P2, and P3 in this order.

The roundabout 300 includes the circular road 310 and six branched roads 312a to 312f (hereinafter also referred to as "roads 312a to 312f"). In FIG. 4, the roads 312a to 312f include entries I1 to I6 (or entry lanes 320a to 320f) and exits E1 to E6 (or exit lanes 322a to 322f).

In the example of FIG. 4, the target route Rtar before the own vehicle 10 enters the roundabout 300 is the route where the own vehicle 10 enters the roundabout 300 from the entry I1 and exits the roundabout 300 from the exit E4. That is to say, in the target route Rtar, the entry I1 is a target entry Itar and the exit E4 is the target exit Etar. However, the exit E4 is congested with the preceding vehicles 330 (330a to 330e). The reason why the exit E4 is congested with the preceding vehicles 330 can be a traffic jam, an accident, construction, or the like; whatever the reason is, the own vehicle 10 cannot recognize the reason. While the own vehicle 10 travels within the roundabout 300 (for example, at the point P2) or before that (for example, at the point P1), the own vehicle 10 detects that the exit E4 is congested with the preceding vehicles 330 (travel restricting event Plim) on the basis of the image information Iimage, for example.

In the first embodiment, the own vehicle 10 having detected the travel restricting event Plim cancels to exit from the exit E4 that is the target exit Etar. Then, the own vehicle 10 searches for a new exit Enew and determines the new exit Enew as a new target exit Etar.

(A-2-3-2. Specific Procedure)

Figure 5:
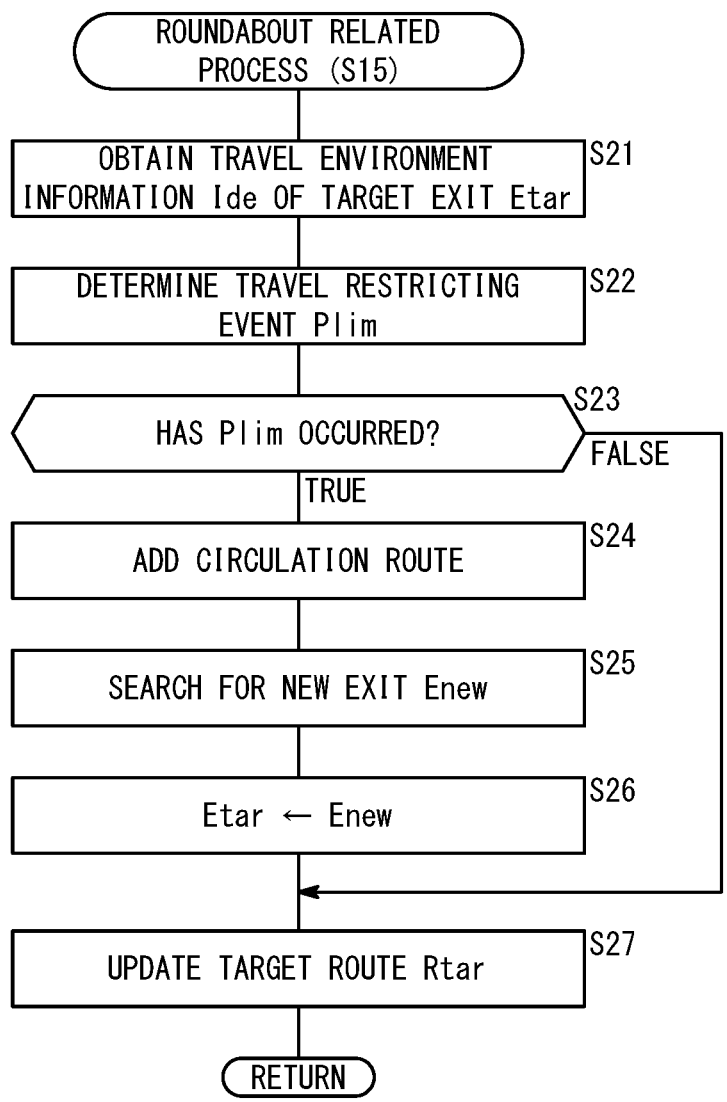
FIG. 5 is a flowchart (details of S15 in FIG. 3) of the roundabout related process in the first embodiment.

FIG. 5 is a flowchart (details of S15 in FIG. 3) of the roundabout related process in the first embodiment. In step S21, the navigation device 22 obtains travel environment information Ide regarding the target exit Etar (exit E4 in FIG. 4) from the AD unit 40. The travel environment information Ide includes, for example, preceding vehicle information, accident information, construction information, and the traffic jam information.

The preceding vehicle information includes, for example, a position, numbers on a license plate, a moving direction, and a moving speed of the preceding vehicle 330. The preceding vehicle information can be obtained from, for example, the external environment information Ie (image information Iimage, radar information Iradar, etc.). Alternatively, the preceding vehicle information may be obtained by the communication between the own vehicle 10 and the preceding vehicle 330 (peripheral vehicle).

The accident information includes, for example, a position and the detail of the accident, whether the road is closed. The accident information can be obtained from, for example, the external environment information Ie (image information Iimage, radar information Iradar, etc.). Alternatively, the accident information may be obtained by the communication between the own vehicle 10 and the preceding vehicle 330 (peripheral vehicle).

The construction information includes, for example, a position and the detail of the construction, whether the road is closed. The construction information can be obtained from, for example, the external environment information Ie (image information Iimage, radar information Iradar, etc.). Alternatively, the construction information may be obtained by the communication between the own vehicle 10 and the preceding vehicle 330 (peripheral vehicle).

The traffic jam information includes a position of the traffic jam (including length), an expected passing time, etc. The traffic jam information may be obtained by, for example, the communication between the own vehicle 10 and the preceding vehicle 330 (peripheral vehicle).

In step S22, the navigation device 22 determines whether the travel restricting event Plim has occurred. In the first embodiment, the travel restricting event Plim is an event where it is better for the own vehicle 10 to avoid passing the target exit Etar. The travel restricting event Plim may include, for example, the accident, the construction, and the traffic jam. If the travel restricting event Plim has occurred (S23: TRUE), the process advances to step S24. If the travel restricting event Plim does not occur (S23: FALSE), the process advances to step S27.

In step S24, the navigation device 22 adds a circulation route Rrnd to the target route Rtar. The circulation route Rrnd is a route where the vehicle 10 goes round the roundabout 300 once. Next, in step S25, the navigation device 22 searches for a new exit Enew other than the target exit Etar at the current time point. If there is a plurality of new exits Enew, an expected detour time Tbps taken to reach the destination Ptar is calculated for each new exit Enew and the exit whose expected detour time Tbps is the shortest is selected as the new exit Enew.

From the viewpoint of a comparison of the expected detour times Tbps for the new exits Enew, the expected detour time Tbps may be calculated using a reference point that the vehicle will pass after any new exit Enew and before the destination Ptar (for example, the reference point may be an intersection).

In step S26, the navigation device 22 sets the new exit Enew as the target exit Etar. In step S27, the navigation device 22 updates the target route Rtar including the target exit Etar. The AD unit 40 generates the target trajectory Ltar based on the updated target route Rtar. Thus, the own vehicle 10 exits the roundabout 300 through the target exit Etar (for example, the exit E5) different from the initial target exit Etar (for example, the exit E4), and goes to the destination Ptar.

<A-3. Effect of First Embodiment>

As described above, in the first embodiment, in the case where it is determined that the travel restricting event Plim which restricts the passing through the target exit Etar has occurred at the target exit Etar of the roundabout 300 existing in the target route Rtar (S23: TRUE in FIG. 5), one circulation in the roundabout 300 is added in the target route Rtar (S24). Thus, while the own vehicle 10 goes round the roundabout 300, for example, the target route Rtar can be searched again (or reset). Accordingly, the own vehicle 10 can travel smoothly in the roundabout 300.

In the first embodiment, if it is determined that the travel restricting event Plim has occurred (S23: TRUE in FIG. 5), the route generation unit 80 (route calculation device) sets the exit among a plurality of different exits E1 to E3, E5, and E6 in the roundabout 300, whose expected detour time Tbps taken to reach the reference point Pref in the target route Rtar is the shortest, as the new target exit Etar (S25, S26). Thus, the new target exit Etar can be set as appropriate.

B. Second Embodiment

<B-1. Configuration>

A configuration of the second embodiment is similar to that of the first embodiment as illustrated in FIG. 1 and FIG. 2. Components in the second embodiment similar to those in the first embodiment are denoted by the same reference symbols and the detailed description thereof is omitted. The second embodiment is different from the first embodiment in the roundabout related process.

<B-2. Roundabout Related Process>

[B-2-1. Outline]

In the roundabout related process in the first embodiment (FIG. 5), the process is varied depending on whether the travel restricting event Plim has occurred. In other words, in the first embodiment, there are two patterns in which the travel restricting event Plim has occurred or has not occurred (or in which the vehicle passes the initial target exit Etar or the new target exit Etar).

On the other hand, in the roundabout related process in the second embodiment, there are three patterns in regard to the travel restricting event Plim. That is to say, in the second embodiment, the travel restricting event Plim is divided into a level (first level) to select passing the initial target exit Etar (for example, exit E4), a level (second level) to select passing the new target exit Etar (for example, exit E5), or a level (third level) to suspend the determination and select the circulation in the roundabout 300.

In the travel restricting event Plim at the first level, the preceding vehicle 330 does not exist at the target exit Etar or only a few preceding vehicles 330 exist, so that passing the target exit Etar does not lead to any problem. In other words, the travel restricting event Plim does not occur at the first level. In the travel restricting event Plim at the second level, the accident, the construction, or the traffic jam has occurred at the target exit Etar and the preceding vehicles 330 going to the target exit Etar hardly advance.

In the travel restricting event Plim at the third level, for example, the traffic light (not shown) at the target exit Etar or its vicinity is red. In the travel restricting event Plim at the third level, the target exit Etar is congested with the preceding vehicles 330 (330a to 330e, for example); however, while the own vehicle 10 goes round the roundabout 300, the preceding vehicles 330 (330a to 330e, for example) advance by a long distance.

[B-2-2. Specific Procedure]

Figure 6:
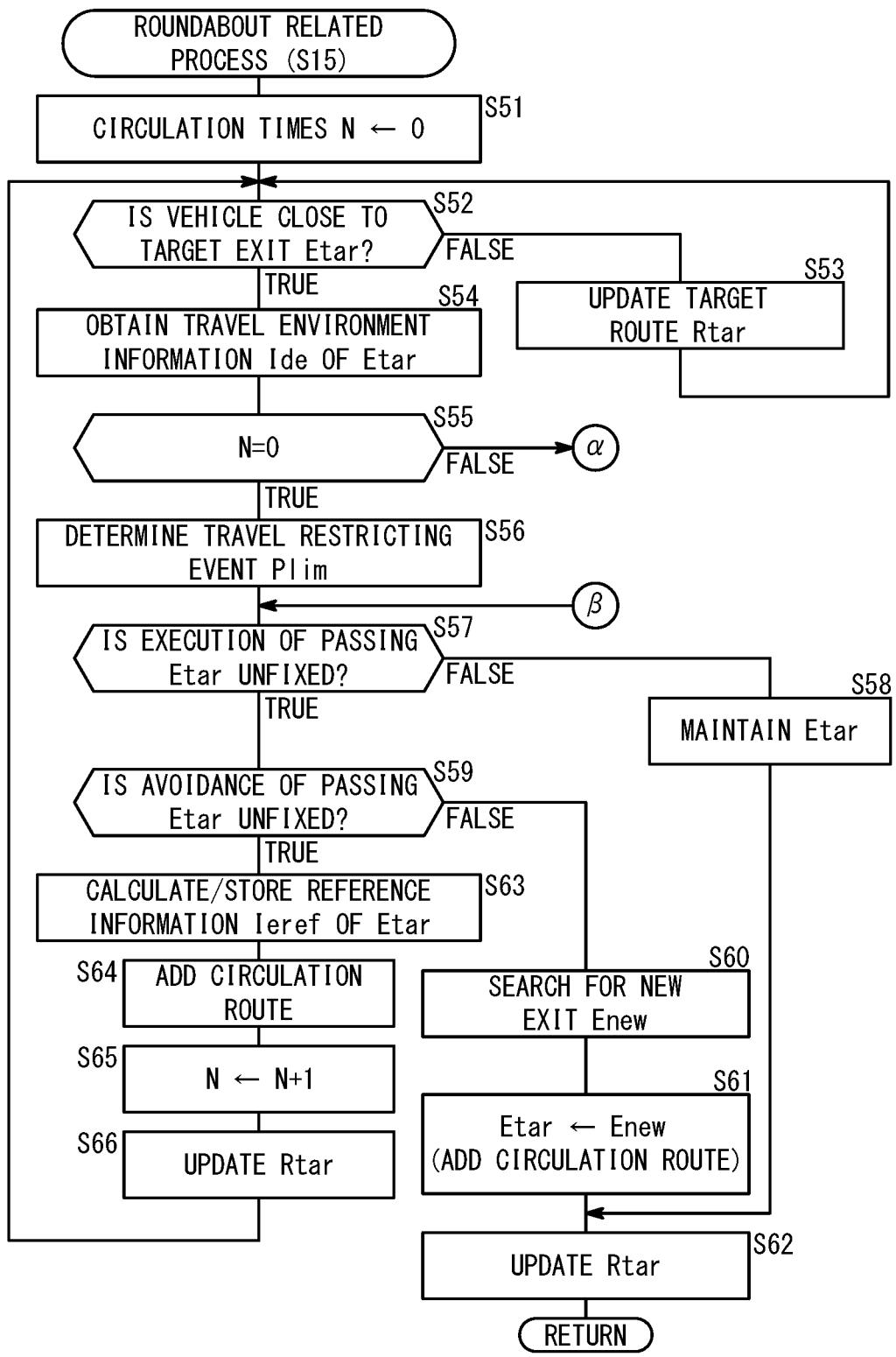
FIG. 6 is a first flowchart (details of S15 in FIG. 3) of the roundabout related process in a second embodiment.
Figure 7:
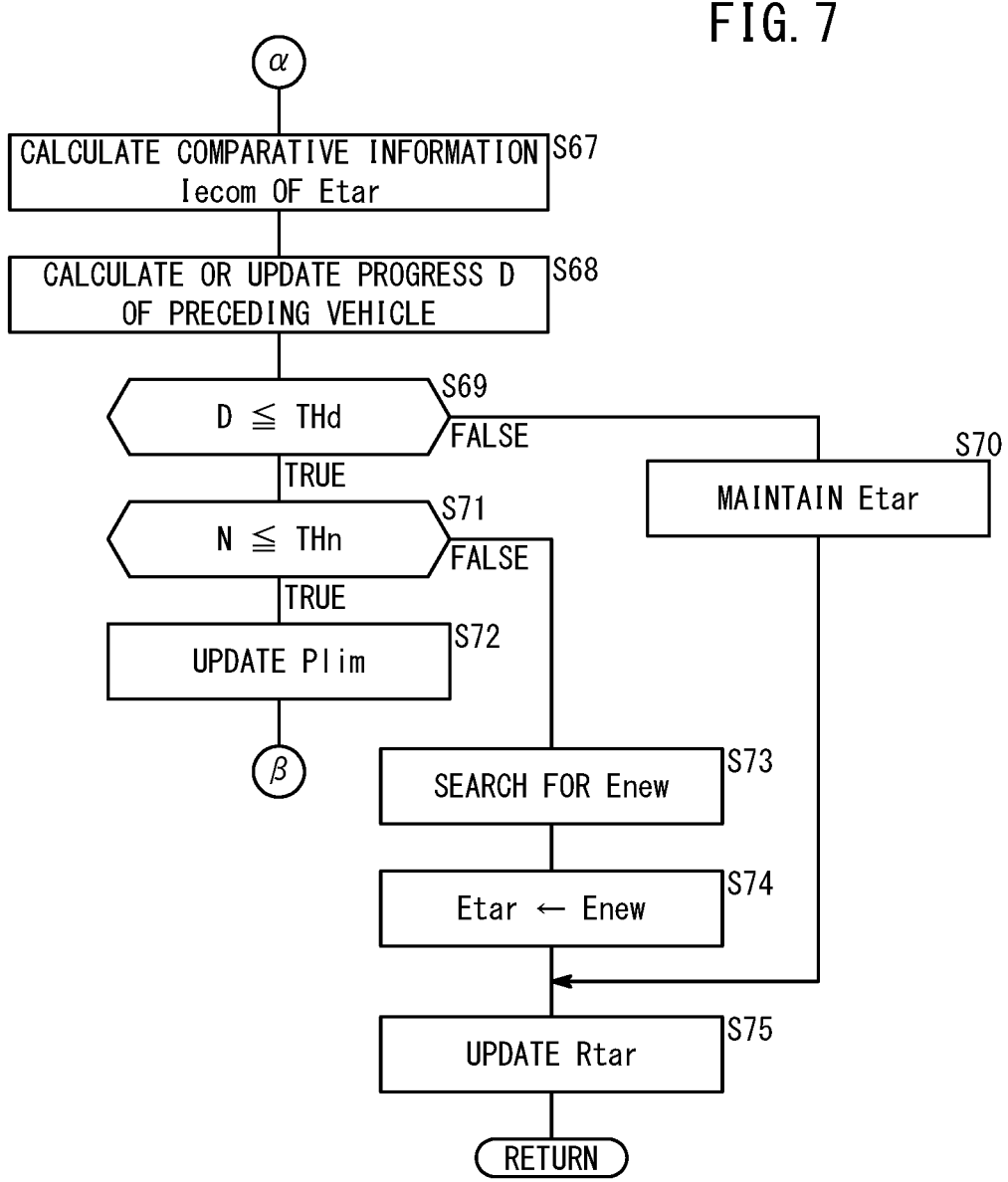
FIG. 7 is a second flowchart (details of S15 in FIG. 3) of the roundabout related process in the second embodiment.

FIG. 6 and FIG. 7 are first and second flowcharts (details of S15 in FIG. 3) of the roundabout related process in the second embodiment. As described above, the roundabout related process is performed (S15) when the own vehicle 10 is within the roundabout 300 (S14: TRUE in FIG. 3).

In step S51, the navigation device 22 sets "0" as the circulation times N of the roundabout 300 (N←0). In step S52, the navigation device 22 determines whether the own vehicle 10 is close to the target exit Etar. This determination is performed, for example, based on whether a distance Le from the own vehicle 10 to the target exit Etar is less than or equal to a distance threshold THle. If the own vehicle 10 is not close to the target exit Etar (S52: FALSE), the target exit Etar is not changed. In this case, in step S53, the navigation device 22 updates the target route Rtar to reflect the advanced distance of the own vehicle 10, and the process returns to step S52. The AD unit 40 generates the target trajectory Ltar based on the updated target route Rtar.

If the own vehicle 10 is close to the target exit Etar (S52: TRUE), the navigation device 22 obtains the travel environment information Ide regarding the target exit Etar from the AD unit 40 in step S54. In the subsequent step S55, the navigation device 22 determines whether the circulation times N is "0". If the circulation times N is "0" (S55: TRUE), the process advances to step S56.

In step S56, the navigation device 22 determines the travel restricting event Plim. As described above, the travel restricting event Plim is divided into the three levels in the second embodiment. That is to say, the three levels are: whether the own vehicle 10 passes the initial target exit Etar, whether the own vehicle 10 passes the new target exit Etar, or whether the determination is suspended and the own vehicle 10 goes round the roundabout 300.

In step S57, the navigation device 22 determines whether the execution of passing the target exit Etar is unfixed. In other words, the navigation device 22 determines whether the travel restricting event Plim is not at the level (first level) where the own vehicle 10 passes the initial target exit Etar. If the execution of passing the target exit Etar is not unfixed (S57: FALSE in FIG. 6), the determination at the first level is fixed. In this case, in step S58, the navigation device 22 maintains the target exit Etar. If the execution of passing the target exit Etar is unfixed (S57: TRUE in FIG. 6), the process advances to step S59.

In step S59, the navigation device 22 determines whether the avoidance of passing the target exit Etar is unfixed. In other words, the navigation device 22 determines whether the travel restricting event Plim is not at the level (second level) where the own vehicle 10 passes the new target exit Etar. If the avoidance of passing the target exit Etar is not unfixed (S59: FALSE in FIG. 6), the determination at the second level is fixed. In this case, in step S60, the navigation device 22 searches for a new exit Enew. In step S61, the navigation device 22 sets the new exit Enew in the new route Rtar. Thus, substantially, the new circulation route Rrnd is added to the target route Rtar.

After step S58 or S61, the navigation device 22 updates the target route Rtar in step S62. The AD unit 40 generates the target trajectory Ltar based on the updated target route Rtar.

Back to step S59, if the avoidance of passing the target exit Etar is unfixed (S59: TRUE in FIG. 6), the travel restricting event Plim is at the level (third level) where the determination is suspended and the own vehicle 10 goes round the roundabout 300. In this case, in step S63, the navigation device 22 calculates reference information Ieref of the target exit Etar on the basis of the travel environment information Ide in step S54 and stores the reference information Ieref in the storage device 124.

The reference information Ieref includes the positional information and the characteristic information of the preceding vehicles 330 (such as the preceding vehicles 330a to 330e in FIG. 4). Depending on the position of the own vehicle 10, for example, the positional information and the characteristic information of the preceding vehicles 330a, 330b, 330c are not obtained and the positional information and the characteristic information of only the preceding vehicles 330d, 330e are obtained. In such a case, the positional information and the characteristic information of only the preceding vehicles 330d, 330e that can be obtained are calculated and stored. The reference information Ieref is used to compare comparative information Iecom to be described below (S68 in FIG. 7). For example, by comparing the reference information Ieref and the comparative information Iecom, progress D (advanced distance L) of the preceding vehicle 330 can be calculated while the own vehicle 10 goes round the roundabout 300 once.

In step S64, the navigation device 22 adds the circulation route Rrnd corresponding to one circulation in the roundabout 300 to the target route Rtar. In the subsequent step S65, one is added to the circulation times N in the roundabout 300. In step S66, the navigation device 22 updates the target route Rtar including the circulation route Rrnd, and in this updated state, the process returns to step S52. The AD unit 40 generates the target trajectory Ltar based on the updated target route Rtar.

If the circulation times N is not "0" (S55: FALSE), the process advances to step S67 in FIG. 7. In step S67, the navigation device 22 calculates the comparative information Iecom of the target exit Etar on the basis of the travel environment information Ide. The comparative information Iecom includes the positional information and the characteristic information regarding the preceding vehicle 330 (FIG. 4). The reference information Iecom is used to compare the reference information Ieref (S63 in FIG. 6).

In step S68, by comparing the reference information Ieref and the comparative information Iecom, the navigation device 22 calculates the progress D (advanced distance L) of the preceding vehicle 330 while the own vehicle 10 goes round the roundabout 300 once.

If the circulation times N is two or more, the navigation device 22 updates the progress D in step S68. In this case, the previous comparative information Iecom is used as the current reference information Ieref. For example, the comparative information Iecom at the circulation times N=2 (which is the reference information Ieref when the circulation times N is 2) is compared with the comparative information Iecom at the circulation times N=3; thus, the progress D is derived. In this case, the average value of the progress D when the circulation times N is one to three may be used.

In step S69, the navigation device 22 determines whether the progress D is less than or equal to a progress threshold THd. The progress threshold THd is a threshold used to determine whether passing the target exit Etar is practical. If the progress D is not less than or not equal to the progress threshold THd (S69: FALSE), the progress D is relatively large; thus, passing the initial target exit Etar is practical (passing is relatively easy). In this case, in step S70, the navigation device 22 maintains the target exit Etar and the process advances to step S75. If the progress D is less than or equal to the progress threshold THd (S69: TRUE), the process advances to step S71.

In step S71, the navigation device 22 determines whether the circulation times N is less than or equal to a circulation times threshold THn. The circulation times threshold THn is a threshold set as the circulation times N that is enough to determine the circumstance at the initial target exit Etar after the circulation in the roundabout 300. If the circulation times N is less than or equal to the circulation times threshold THn (S71: TRUE), in step S72, the navigation device 22 updates the travel restricting event Plim on the basis of the travel environment information Ide obtained in step S54 and the process advances to step S57 in FIG. 6. If the circulation times N is not less than or not equal to the circulation times threshold THn (S71: FALSE), the process advances to step S73.

In step S73, the navigation device 22 searches for a new Exit Enew. If there is a plurality of new exits Enew, the expected detour time Tbps taken to reach the reference point Pref (for example, destination Ptar) is calculated for each new exit Enew and the exit whose expected detour time Tbps is the shortest is selected as the new exit Enew.

In step S74, the navigation device 22 sets the new exit Enew as the target exit Etar. In step S75, the navigation device 22 updates the target route Rtar. The AD unit 40 generates the target trajectory Ltar based on the updated target route Rtar.

<B-3. Effect of Second Embodiment>

According to the second embodiment as described above, the following effect can be obtained in addition to or instead of the effect of the first embodiment.

That is to say, in the second embodiment, the route generation unit 80 (route calculation device) repeats updating the progress D every time the vehicle 10 goes round the roundabout 300 (S68 in FIG. 7). Thus, if it is considered that the progress D of the preceding vehicle 330 stopping at the target exit Etar of the roundabout 300 is large and it does not take much time to pass the target exit Etar, it is possible to maintain the target exit Etar.

In the second embodiment, a peripheral environment detection unit such as the exterior camera 60 detects the preceding vehicle 330 of the vehicle 10. In addition, the route generation unit 80 (route calculation device) obtains the reference information Ieref of the preceding vehicle 330 stopping at the target exit Etar (S54 in FIG. 6). Moreover, the route generation unit 80 obtains the comparative information Iecom of the preceding vehicle 330 stopping at the target exit Etar after one circulation in the roundabout 300 (S67). Additionally, the route generation unit 80 determines the progress D of the preceding vehicle 330 by comparing the reference information Ieref and the comparative information Iecom (S68). Furthermore, if the progress D of the preceding vehicle 330 is more than the progress threshold THd (S69: FALSE), the route generation unit 80 maintains the target route Rtar that includes the target exit Etar (S70, S75). Thus, if it is expected that the vehicle 10 can easily pass the target exit Etar, the initial target route Rtar can be maintained.

C. Third Embodiment

<C-1. Configuration>

A configuration of the third embodiment is similar to that of the first or second embodiment as illustrated in FIG. 1 and FIG. 2. Components similar to those in the first and second embodiments are denoted by the same reference symbols and the detailed description thereof is omitted. The third embodiment is different from the first and second embodiments in the roundabout related process.

<C-2. Roundabout Related Process>

[C-2-1. Outline]

In the roundabout related process in the second embodiment (FIG. 6 and FIG. 7), the three patterns are provided in regard to the travel restricting event Plim. That is to say, in the second embodiment, the travel restricting event Plim is divided into the level (first level) to select passing the initial target exit Etar, the level (second level) to select passing the new target exit Etar, or the level (third level) to suspend the determination and select the circulation in the roundabout 300.

On the other hand, in the roundabout related process according to the third embodiment, the target route Rtar is set by comparing an initial expected time Torg or an updated expected time Tup in a case where the own vehicle 10 passes the target exit Etar, and the expected detour time Tbps in a case where the own vehicle 10 passes each of the different exits Eo. The initial expected time Torg corresponds to a time expected to take from the target exit Etar to the reference point Pref (for example, the destination Ptar) under a condition before it is determined that the initial target exit Etar is congested with the preceding vehicles 330 (the travel restricting event Plim has occurred) or a condition reflecting the travel restricting event Plim. The updated expected time Tup corresponds to a time in which the initial expected time Torg or the previous updated expected time Tup is corrected (or updated) in accordance with the progress D of the preceding vehicle 330.

Figure 8:
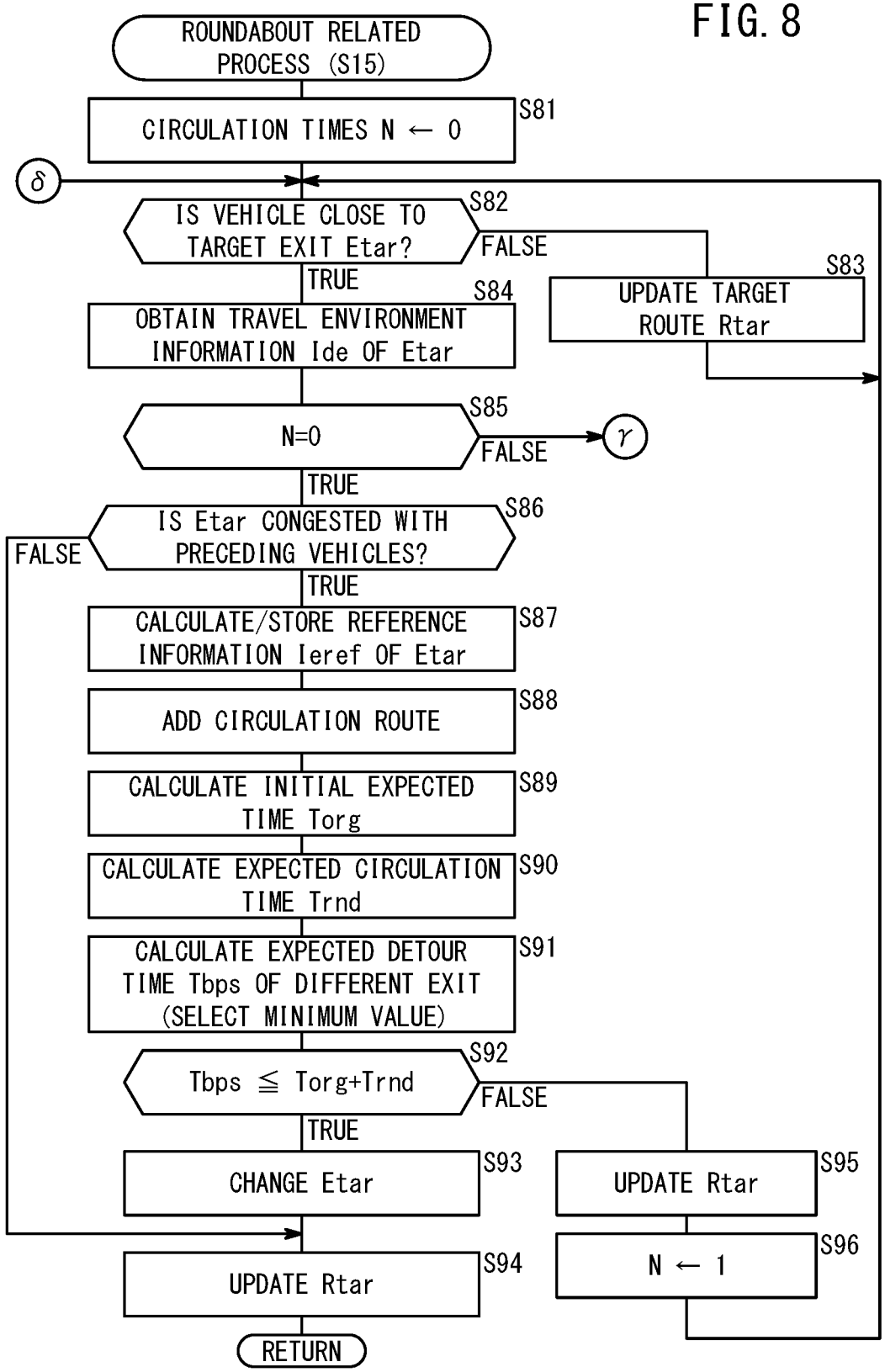
FIG. 8 is a first flowchart (details of S15 in FIG. 3) of the roundabout related process in a third embodiment.

In order to facilitate understanding, in the third embodiment, the travel restricting event Plim is limited to the congestion of the target exit Etar with the preceding vehicles 330 (S86 in FIG. 8). However, in the third embodiment, other travel restricting events Plim may be employed.

[C-2-2. Specific Process]

Figure 9:
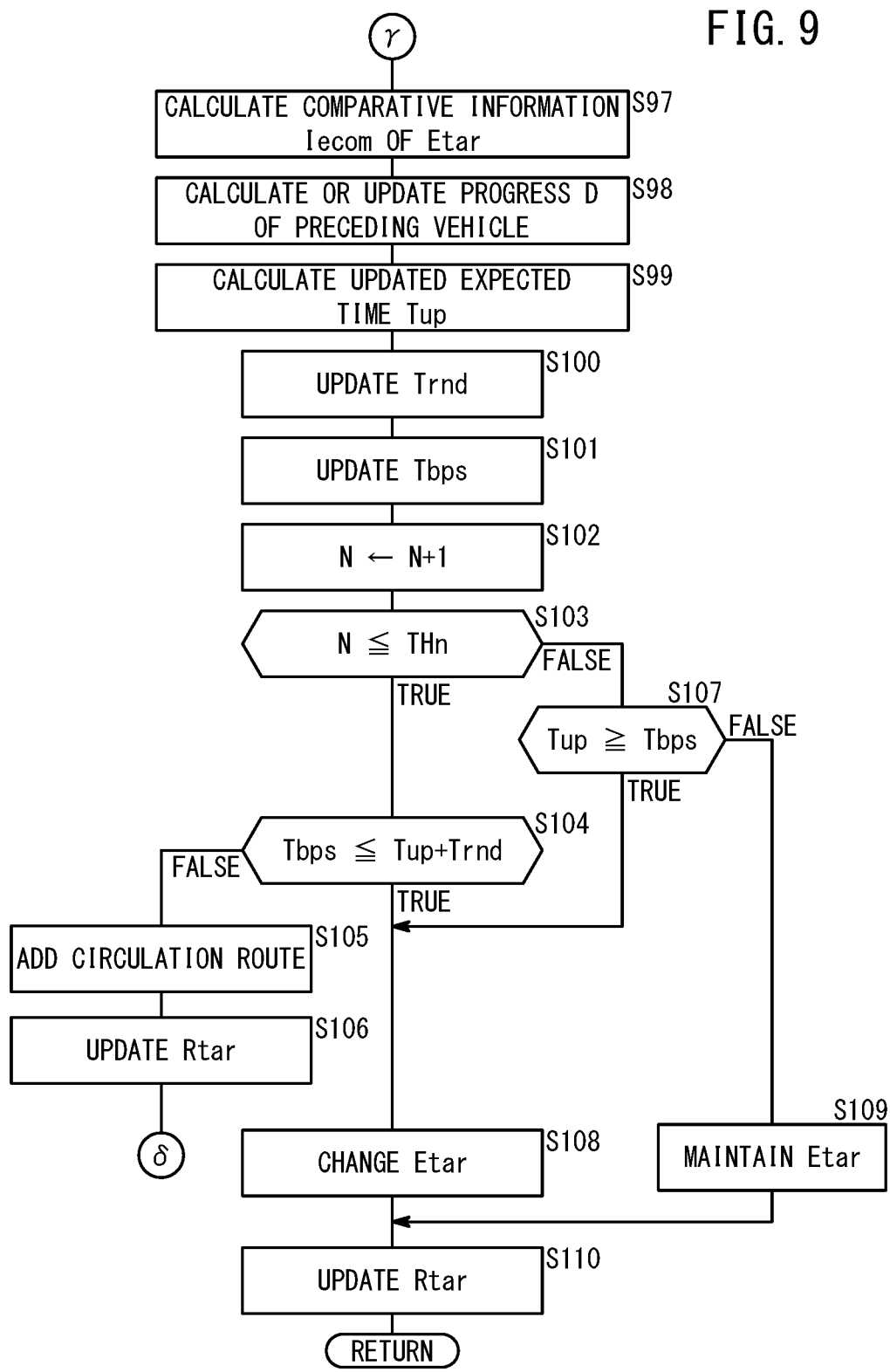
FIG. 9 is a second flowchart (details of S15 in FIG. 3) of the roundabout related process in the third embodiment.

FIG. 8 and FIG. 9 are first and second flowcharts of the roundabout related process in the third embodiment (details of S15 in FIG. 3). As described above, when the own vehicle 10 is within the roundabout 300 (S14: TRUE in FIG. 3), the roundabout related process is performed (S15).

Steps S81, S82, S83, S84, and S85 in FIG. 8 are similar to steps S51, S52, S53, S54, and S55 in FIG. 6. If the circulation times N in the roundabout 300 is "0" (S85: TRUE), the process advances to step S86.

In step S86, the navigation device 22 determines whether the target exit Etar is congested with the preceding vehicles 330 (a predetermined number or more vehicles). If the target exit Etar is not congested with the preceding vehicles 330 (S86: FALSE), the process advances to step S94. If the target exit Etar is congested with the preceding vehicles 330 (S86: TRUE), the process advances to step S87.

Steps S87, S88 are similar to steps S63, S64 in FIG. 6.

In step S89, the navigation device 22 calculates the initial expected time Torg. The initial expected time Torg corresponds to a time expected to take from the target exit Etar to the destination Ptar under a condition before it is determined that the initial target exit Etar is congested with the preceding vehicles 330 (the travel restricting event Plim has occurred) or a condition reflecting the travel restricting event Plim. From the viewpoint of a comparison of the initial expected time Torg and the expected detour time Tbps to be described below, the initial expected time Torg and the expected detour time Tbps may be calculated using the reference point that the vehicle 10 will pass before the destination Ptar (for example, the reference point is an intersection).

In step S90, the navigation device 22 calculates an expected circulation time Trnd. The expected circulation time Trnd is a time expected to take to go round the roundabout 300 once.

In step S91, the navigation device 22 calculates the expected detour time Tbps of the different exit Eo. The expected detour time Tbps is a time expected to take to reach the destination Ptar through the different exit Eo. If there is a plurality of new exits Enew, the expected detour time Tbps is calculated for each new exit Enew and the exit whose expected detour time Tbps is the shortest is selected.

In step S92, the navigation device 22 determines whether the expected detour time Tbps is less than or equal to the total of the initial expected time Torg and the expected circulation time Trnd. If the expected detour time Tbps is less than or equal to the total of the initial expected time Torg and the expected circulation time Trnd (S92: TRUE), the navigation device 22 sets the new exit Enew for the expected detour time Tbps as the target exit Etar in step S93. If step S86 is false or after step S93, the navigation device 22 updates the target route Rtar in step S94. The AD unit 40 generates the target trajectory Ltar based on the updated target route Rtar.

Note that the process in step S92 is intended to determine whether to change the target exit Etar. Therefore, a predetermined coefficient may be added to or multiplied by both or one of the expected detour time Tbps, and the total of the initial expected time Torg and the expected circulation time Trnd.

If the expected detour time Tbps is not less than or not equal to the total of the initial expected time Torg and the expected circulation time Trnd (S92: FALSE), the process advances to step S95. In step S95, the navigation device 22 updates the target route Rtar while maintaining the target exit Etar. The AD unit 40 generates the target trajectory Ltar based on the updated target route Rtar. In step S96, the navigation device 22 sets "1" as the circulation time N, and the process returns to step S82. The process in step S96 is performed after it is determined that the own vehicle 10 has gone round the roundabout 300 once.

If the circulation times N in the roundabout 300 is not "0" (S85: FALSE), the process advances to step S97 in FIG. 9. Steps S97, S98 are similar to steps S67, S68 in FIG. 7.

In step S99, the navigation device 22 calculates the updated expected time Tup corresponding to the initial expected time Torg that has been updated. Specifically, the initial expected time Torg or the previous updated expected time Tup is corrected in accordance with the progress D of the preceding vehicle 330 calculated in step S98; thus, the current updated expected time Tup is obtained.

In step S100, the navigation device 22 updates the expected circulation time Trnd. Specifically, the navigation device 22 regards the time (average time) to go round the roundabout 300 once, as the expected circulation time Trnd.

In step S101, the navigation device 22 updates the expected detour time Tbps. Specifically, the navigation device 22 obtains the travel environment information Ide from the AD unit 40 in a manner similar to the target exit Etar for each of the different exits Eo, and calculates or updates the progress D of the preceding vehicle 330 for each of the different exits Eo. Then, the navigation device 22 generates the expected detour time Tbps of the different exit Eo in reflection of this progress D.

In step S102, the navigation device 22 adds one to the circulation times N. In step S103, the navigation device 22 determines whether the circulation times N is less than or equal to the circulation times threshold THn. If the circulation times N is less than or equal to the circulation times threshold THn (S103: TRUE), the process advances to step S104.

In step S104, the navigation device 22 determines whether the expected detour time Tbps is less than or equal to the total of the updated expected time Tup and the expected circulation time Trnd. Similarly to step S92, the process in step S104 is intended to determine whether to change the target exit Etar. Therefore, the predetermined coefficient may be added to or multiplied by both or one of the expected detour time Tbps, and the total of the updated expected time Tup and the expected circulation time Trnd. If the expected detour time Tbps is not less than or not equal to the total of the updated expected time Tup and the expected circulation time Trnd (S104: FALSE), the navigation device 22 adds the circulation route Rrnd to go round the roundabout 300 once in step S105.

In the subsequent step S106, the navigation device 22 updates the target route Rtar while maintaining the target exit Etar, and the process returns to step S82 in FIG. 8. The AD unit 40 generates the target trajectory Ltar based on the updated target route Rtar.

If the expected detour time Tbps is less than or equal to the total of the updated expected time Tup and the expected circulation time Trnd (S104: TRUE), the process advances to step S108.

Back to step S103, if the circulation times N is not less than or not equal to the circulation times threshold THn (S103: FALSE), the circulation times N is more than the circulation times threshold THn and it is considered that the own vehicle 10 has gone round the roundabout 300 enough times. In this case, in step S107, the navigation device 22 determines whether the updated expected time Tup is more than or equal to the expected detour time Tbps. In other words, the updated expected time Tup and the expected detour time Tbps are compared to decide which one is longer. If the updated expected time Tup is more than or equal to the expected detour time Tbps (S107: TRUE), the expected detour time Tbps is shorter than the updated expected time Tup. In this case, in step S108, the navigation device 22 sets the new exit Enew for the expected detour time Tbps as the target exit Etar.

If the updated expected time Tup is not more than or not equal to the expected detour time Tbps (S107: FALSE), the updated expected time Tup is shorter than the expected detour time Tbps. In this case, in step S109, the navigation device 22 maintains the target exit Etar. After step S108 or S109, the navigation device 22 updates the target route Rtar in step S110. The AD unit 40 generates the target trajectory Ltar based on the updated target route Rtar.

<C-3. Effect of Third Embodiment>

According to the third embodiment as described above, the following effect can be obtained in addition to or instead of the effects of the first and second embodiments.

That is to say, in the third embodiment, if it is determined that the target exit Etar is congested with the preceding vehicles 330 (the travel restricting event Plim has occurred) (S86: TRUE in FIG. 8), the route generation unit 80 (route calculation device) calculates the initial expected time Torg, the expected detour time Tbps, and the expected circulation time Trnd (S89 to S91). In addition, if the expected detour time Tbps is shorter than the total of the initial expected time Torg and the expected circulation time Trnd (S92: TRUE), the route generation unit 80 sets the target route Rtar again so that the target route Rtar includes the different exit Eo (S93, S94).

Thus, in the case where it is expected to reach the reference point Pref sooner when passing the different exit Eo than when going round the roundabout 300 once and considering the change at the target exit Etar, choosing to pass the different exit Eo makes it possible to reach the reference point Pref sooner.

In the third embodiment, the peripheral environment detection unit such as the exterior camera 60 detects the preceding vehicle 330 of the vehicle 10. In addition, the route generation unit 80 (route calculation device) obtains the reference information Ieref of the preceding vehicle 330 stopping at the target exit Etar (S87 in FIG. 8). Moreover, the route generation unit 80 obtains the comparative information Iecom of the preceding vehicle 330 stopping at the target exit Etar after one circulation in the roundabout 300 (S97 in FIG. 9). Additionally, the route generation unit 80 determines the progress D of the preceding vehicle 330 by comparing the reference information Ieref and the comparative information Iecom (S98). Moreover, on the basis of the progress D, the route generation unit 80 calculates the updated expected time Tup taken to reach the reference point Pref in the target route Rtar through the target exit Etar (S99). Furthermore, the route generation unit 80 calculates the expected detour time Tbps taken to reach the reference point Pref through the different exit Eo of the roundabout 300 (S101). If the expected detour time Tbps is longer than the total of the updated expected time Tup and the expected circulation time Trnd (S104: FALSE in FIG. 9), the route generation unit 80 maintains the target route Rtar. In addition, if the expected detour time Tbps is shorter than the total of the updated expected time Tup and the expected circulation time Trnd (S104: TRUE), the route generation unit 80 resets the target route Rtar so that the target route Rtar includes the different exit Eo (S108, S110).

Thus, the target route Rtar can be maintained or reset in consideration of the change at the target exit Etar as the own vehicle 10 goes round the roundabout 300.

In the third embodiment, if the expected detour time Tbps is not less than or not equal to the total of the updated expected time Tup and the expected circulation time Trnd (S104: FALSE) (i.e., if the difference between the updated expected time Tup and the expected detour time Tbps is less than a time threshold THt), the route generation unit 80 (route calculation device) causes the own vehicle 10 to go round the roundabout 300 once again (S105). By one more circulation in the roundabout 300, the updated expected time Tup can be calculated with higher accuracy.

In the third embodiment, if the circulation times N in the roundabout 300 is more than the circulation times threshold THn (S103: FALSE) in the state where the expected detour time Tbps is not less than or not equal to the total of the updated expected time Tup and the expected circulation time Trnd (S104: FALSE in FIG. 9), the route generation unit 80 (route calculation device) uses the target route Rtar including the shorter one of the updated expected time Tup and the expected detour time Tbps (S107 to S110). Thus, in the state that a certain degree of calculation accuracy is secured in regard to the updated expected time Tup, the target route Rtar can be selected using the expected time that is assumed to be shorter (updated expected time Tup or expected detour time Tbps).

D. Modifications

Note that the present invention is not limited to the above embodiments, and can employ various configurations on the basis of the description in the present specification. For example, the following configurations can be employed.

<D-1. Vehicle 10>

[D-1-1. Autonomous Driving Control]

In the first embodiment, the vehicle 10 keeps to the left (FIG. 4). However, for example, from the viewpoint of the roundabout related process, the present invention is also applicable in a case where the vehicle 10 keeps to the right. This point similarly applies to the second and third embodiments.

[D-1-2. Roundabout Related Process]

In the second embodiment, if both the execution and the avoidance of passing the target exit Etar are unfixed (S57: TRUE and S59: TRUE in FIG. 6), the circulation route Rrnd corresponding to one circulation in the roundabout 300 is added (S64). However, the present invention is not limited to this example from the viewpoint of calculating the expected detour time Tbps of the different exit Eo when it is determined that the travel restricting event Plim has occurred at the target exit Etar, for example.

For example, the circulation route Rrnd to a different exit Eo (for example, exit E5) that is adjacent to the target exit Etar (for example, exit E4) in a circulation direction of the roundabout 300 (clockwise in FIG. 4) may be added. In addition, the expected detour time Tbps of the different exit Eo may be calculated and compared with the initial expected time Torg. As a result, if the different exit Eo is not regarded as the new target exit Etar, the circulation route Rrnd to another different exit Eo (for example, exit E6) that is adjacent to the different exit Eo (for example, exit E5) may be added. In addition, the expected detour time Tbps of the different exit Eo (for example, exit E6) may be calculated and compared with the initial expected time Torg. Such a procedure may be repeated. This point similarly applies to the third embodiment.

In the third embodiment (S92 in FIG. 8), the expected detour time Tbps and the total of the initial expected time Torg and the expected circulation time Trnd are compared. However, if the expected circulation time Trnd is relatively short when compared with the initial expected time Torg and the expected detour time Tbps, the expected circulation time Trnd may be omitted. That is to say, the initial expected time Torg and the expected detour time Tbps may be compared. This point similarly applies to step S104 in FIG. 9.

<D-2. Others>

The above embodiments employ the flowcharts in FIG. 3, and FIG. 5 to FIG. 9. However, for example, the contents of the flowcharts (order of steps) are not limited to those above, as long as the effect of the present invention can be obtained. For example, in FIG. 6, step S65 may come before step S64.

In the second embodiment, some comparisons of numerals use an equal sign while others do not (for example, S69 in FIG. 7). However, for example, if there is no special reason to use or not to use the equal sign (in other words, as long as effect of the present invention can be obtained), whether to use the equal sign in comparing the numerals can be set arbitrarily.

Therefore, for example, the determination as to whether the progress D is less than or equal to the progress threshold THd (D≤THd) in step S69 in FIG. 7 can be replaced by determination as to whether the progress D is less than the progress threshold THd (D<THd).

What is claimed is:

1. A vehicle comprising:
    a destination setting device configured to set a destination of the vehicle;
    a route calculation device configured to calculate a target route from a current position to the destination;
    a travel control unit configured to cause the vehicle to travel autonomously in at least a part of a route to the destination; and
    a peripheral environment detection unit configured to detect a peripheral travel environment of the vehicle and detect a roundabout that exists in the target route,
    wherein if it is determined that, at a target exit of the roundabout that exists in the target route, a travel restricting event that restricts passing of the vehicle through the target exit has occurred on a basis of the peripheral travel environment, the route calculation device is configured to add a circulation route corresponding to one circulation or a part of the circulation in the roundabout to the target route.

2. The vehicle according to claim 1, wherein if it is determined that the travel restricting event has occurred, the route calculation device is configured to set an exit whose expected detour time taken to reach a reference point in the target route is shortest among a plurality of different exits of the roundabout, as a new target exit.

3. The vehicle according to claim 1, wherein if it is determined that the travel restricting event has occurred, the route calculation device is configured to:
    calculate an initial expected time expected to take from the target exit to a reference point in the target route under a condition before it is determined that the travel restricting event has occurred or a condition reflecting the travel restricting event, an expected detour time expected to take to reach the reference point through a different exit of the roundabout, and an expected circulation time expected to take to go round the roundabout once; and
    if the expected detour time is shorter than a total of the initial expected time and the expected circulation time, reset the target route so that the target route includes the different exit.

4. The vehicle according to claim 1, wherein:
    the peripheral environment detection unit is configured to detect a preceding vehicle that exists ahead of the vehicle; and
    the route calculation device is configured to obtain reference information of the preceding vehicle stopping at the target exit, obtain comparative information of the preceding vehicle stopping at the target exit after one circulation, determine progress of the preceding vehicle by comparing the reference information and the comparative information, and maintain the target exit in a case where the progress is more than a progress threshold.

5. The vehicle according to claim 1, wherein:
    the peripheral environment detection unit is configured to detect a preceding vehicle that exists ahead of the vehicle; and
    the route calculation device is configured to obtain reference information of the preceding vehicle stopping at the target exit, obtain comparative information of the preceding vehicle stopping at the target exit after one circulation, determine progress of the preceding vehicle by comparing the reference information and the comparative information, calculate an updated expected time taken to reach a reference point in the target route through the target exit on a basis of the progress, calculate an expected detour time taken to reach the reference point through a different exit of the roundabout, maintain the target route in a case where the expected detour time is longer than the updated expected time, and reset the target route so that the target route includes the different exit in a case where the expected detour time is shorter than the updated expected time.

6. The vehicle according to claim 5, wherein the route calculation device is configured to repeat updating the progress or the updated expected time every time the vehicle goes round the roundabout.

7. The vehicle according to claim 5, wherein the route calculation device is configured to cause the vehicle to go round the roundabout again in a case where a difference between the updated expected time and the expected detour time is less than a time threshold.

8. The vehicle according to claim 7, wherein the route calculation device is configured to use the target route including the shorter one of the updated expected time and the expected detour time in a case where circulation times in the roundabout is more than a circulation times threshold in a state that the difference between the updated expected time and the expected detour time is less than the time threshold.

9. A route calculation device configured to calculate a target route from a current position of a vehicle to a destination that is set through a destination setting device, wherein the route calculation device is configured to:

obtain, from a peripheral environment detection unit, information regarding a peripheral travel environment of the vehicle and information regarding a roundabout that exists in the target route; and if it is determined that, at a target exit of the roundabout that exists in the target route, a travel restricting event that restricts passing of the vehicle through the target exit has occurred on a basis of the peripheral travel environment, add a circulation route corresponding to a circulation in the roundabout to the target route.

10. A route calculation method including a target route calculation step where a route calculation device calculates a target route from a current position of a vehicle to a destination of the vehicle that is set through a destination setting device, the method comprising:

a detection step where a peripheral environment detection unit detects a peripheral travel environment of the vehicle and a roundabout that exists in the target route;

a determination step where the route calculation device determines whether, at a target exit of the roundabout that exists in the target route, a travel restricting event that restricts passing of the vehicle through the target exit has occurred on a basis of the peripheral travel environment; and an addition step where the route calculation device adds a circulation route corresponding to a circulation in the roundabout to the target route in a case where it is determined that the travel restricting event has occurred.

* * * * *